US010306323B2

(12) United States Patent
Jeon et al.

(10) Patent No.: US 10,306,323 B2
(45) Date of Patent: May 28, 2019

(54) FAST TELEVISION CHANNEL CHANGE INITIATED FROM A SECOND SCREEN DEVICE

(71) Applicant: Google Inc., Mountain View, CA (US)

(72) Inventors: Joon-Hee Jeon, Palo Alto, CA (US); Nathan Plumley, Palo Alto, CA (US); Stephen Lau, Oakland, CA (US)

(73) Assignee: Google LLC, Mountain View, CA (US)

( * ) Notice: Subject to any disclaimer, the term of this patent is extended or adjusted under 35 U.S.C. 154(b) by 47 days.

(21) Appl. No.: 15/372,239

(22) Filed: Dec. 7, 2016

(65) Prior Publication Data

US 2018/0160179 A1 Jun. 7, 2018

(51) Int. Cl.
*G06F 3/00* (2006.01)
*G06F 13/00* (2006.01)
(Continued)

(52) U.S. Cl.
CPC ....... *H04N 21/4722* (2013.01); *H04N 5/4403* (2013.01); *H04N 21/2747* (2013.01); *H04N 21/42207* (2013.01); *H04N 21/42208* (2013.01); *H04N 21/42224* (2013.01); *H04N 21/42228* (2013.01); *H04N 21/4384* (2013.01); *H04M 1/72533* (2013.01); *H04N 2005/4425* (2013.01)

(58) Field of Classification Search
CPC combination set(s) only.
See application file for complete search history.

(56) References Cited

U.S. PATENT DOCUMENTS 6,476,825 B1 * 11/2002 Croy .................... H04N 5/4403
348/14.05
8,782,528 B2 * 7/2014 Strober .................. H04L 65/60
715/734
(Continued)

FOREIGN PATENT DOCUMENTS

WO 2005074290 8/2005
WO 2018106305 6/2018

OTHER PUBLICATIONS

"International Search Report", PCT App. No. PCT/US2017/051655, dated Jan. 15, 2018, 6 pages.
(Continued)

*Primary Examiner* — Mulugeta Mengesha
(74) *Attorney, Agent, or Firm* — Colby Nipper

(57) ABSTRACT

In aspects of fast television channel change initiated from a second screen device, a mobile device implemented as the second screen device can receive a navigation input in a viewport displayed on an integrated display of the mobile device. Video selection options for video content are displayed in the viewport on the integrated display of the mobile device responsive to the navigation input. A content display application on the mobile device can determine video identifiers of the video content for each of the video selection options displayed in the viewport, where each video identifier uniquely identifies a respective video content. The mobile device can then communicate the video identifiers to a first screen device, such as a television display device, that initiates a request to a video content server for initial video data corresponding to each of the video content based on the video identifiers received from the mobile device.

20 Claims, 6 Drawing Sheets

(51) Int. Cl.
*H04N 5/445* (2011.01)
*H04N 21/4722* (2011.01)
*H04N 21/2747* (2011.01)
*H04N 5/44* (2011.01)
*H04N 21/422* (2011.01)
*H04N 21/438* (2011.01)
*H04M 1/725* (2006.01)

(56) References Cited

U.S. PATENT DOCUMENTS

| | | | | |
|---|---|---|---|---|
| 8,792,058 | B2* | 7/2014 | Hardacker | H04N 5/4403 348/563 |
| 2011/0134322 | A1* | 6/2011 | Wills | H04N 21/42208 348/563 |
| 2011/0273625 | A1* | 11/2011 | McMahon | G06F 21/445 348/734 |
| 2012/0131098 | A1* | 5/2012 | Wood | G06F 3/0482 709/203 |
| 2012/0162536 | A1* | 6/2012 | Sibilsky | G06F 3/033 348/734 |
| 2015/0312512 | A1* | 10/2015 | Qian | H04M 1/7253 348/731 |

OTHER PUBLICATIONS

"Invitation to Pay Additional Fees and Partial Search Report", dated Nov. 10, 2017, 11 pages.
"Written Opinion", PCT App. No. PCT/US2017/051655, dated Jan. 15, 2018, 8 pages.
Lee, et al., "Reducing IPTV Channel Switching Time using H.264 Scalable Video Coding", Second International conference Electrical Engineering, 2008, IEEE, Piscataway, NJ, as cited in Partial International Search of PCT Application No. PCT/US2017/051655 on Nov. 10, 2017, 4 pages.
"Written Opinion", PCT Application No. PCT/US2017/051655, dated Oct. 4, 2018, 5 pages.
"Foreign Office Action", PCT Application No. PCT/US2017/051655, Jan. 14, 2019, 3 pages.

* cited by examiner

FAST TELEVISION CHANNEL CHANGE INITIATED FROM A SECOND SCREEN DEVICE

BACKGROUND

Many device users have electronic and computing devices, such as mobile phones, tablet computers, multimedia devices, and other similar devices. These types of devices are increasingly utilized as television display devices, and video content streaming of live television and/or recorded video content is ever more commonplace. These types of devices are rapidly evolving to accommodate the users who want to stream video content, such as on their mobile devices, as well as watch the same content on a larger screen television device. A user of a mobile device can initiate video content being displayed on a television device by utilizing the mobile device as a remote control to cast the video content to the television device for display and viewing.

However, as video streaming technologies continue to improve, so do user expectations, to the point that users become frustrated with the delays when changing channels, and when swapping back and forth between content channels. Channel change delays are typical with streaming content, and in particular, for digital content as a device receives a channel change input, requests the new video content from a content server, begins receiving the new video content, and processes the received video content for display. Depending on device and bandwidth limitations, a simple channel change can take several seconds to complete so that the video content selected by a user begins displaying.

BRIEF DESCRIPTION OF THE DRAWINGS

Aspects of fast television channel change initiated from a second screen device are described with reference to the following Figures. The same numbers may be used throughout to reference like features and components that are shown in the Figures.

DETAILED DESCRIPTION

Figure 1:
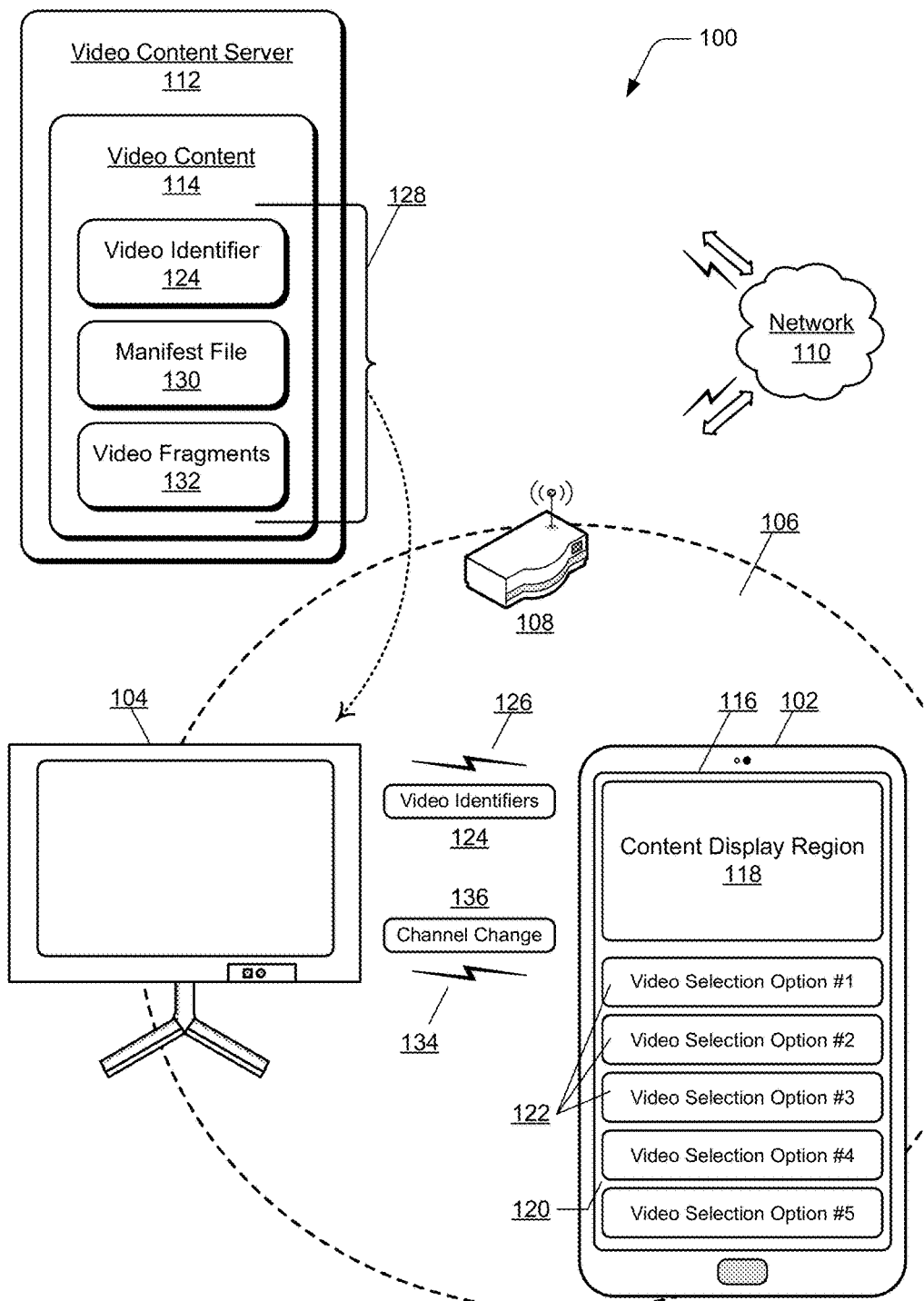
FIG. 1 illustrates an example video content viewing system in which aspects of fast television channel change initiated from a second screen device can be implemented as described herein.

Fast television channel change initiated from a second screen device is described, and features are implemented to minimize the delay time between when a user initiates a video content selection on a mobile device (e.g., the second screen device) to change the video content that is displayed for viewing on a television display device (e.g., the first screen device). Video selection options for video content can be displayed on the mobile device, and the displayed selection options are the likely candidates that a user will select to initiate displaying on the television display device. A content display application (e.g., a software application) on the mobile device is implemented to anticipate that one of the video selection options currently being displayed on the mobile device is likely to be selected by the user. The content display application therefore determines video identifiers of the video content corresponding to each of the displayed video selection options.

The mobile device then communicates the video identifiers to the television display device, which initiates the television display device to request at least initial video data of the video content identified by the video identifiers. The television display device can then prepare for displaying any one of the video content when the user selects one of the video selection options on the mobile device to initiate displaying the video content on the television display device. In implementations, the manifest file for the selected video content, as well as some initial video data fragments, are already available for processing at the television display device when the user selection is initiated, and the video content can begin displaying immediately. To the user, this appears as a very fast television channel change to initiate displaying the selected video content on the television display device.

In an event that the television display device does not already have the initial video data available to begin processing for display when the mobile device communicates a video content selection, the television display device can request to fetch a thumbnail image, or other graphic or static image, that represents the selected video content. Additionally, the television display device can request to receive the audio for the selected video content. The television display device can then display the image and/or playback the audio corresponding to the selected video content during the delay while waiting to receive the video data fragments and beginning to display the video content for viewing. This improves the user experience during a channel change or video content swap, and rather than only seeing a dark screen without audio, the user will see an image, or images, as well as hear the audio that corresponds to the selected video content.

In aspects of fast television channel change initiated from a second screen device, a mobile device can be implemented as the second screen device and receive a navigation input in a viewport displayed on an integrated display of the mobile device. Video selection options for video content can also be displayed in the viewport on the integrated display of the mobile device responsive to the navigation input. For example, the mobile device receives the navigation input as a user manipulation to move the video selection options into view in the viewport, and to move previous video selection options out of view through the viewport. A content display application on the mobile device can determine video identifiers of the video content for each of the video selection options displayed in the viewport, where each video identifier uniquely identifies a respective video content. The mobile device can then communicate the video identifiers to a first screen device, such as a television display device, that initiates a request to a video content server for initial video data corresponding to each of the video content based on the video identifiers received from the mobile device.

The television display device can request the initial video data corresponding to each of the video content from the video content server. The initial video data includes the video identifier of a video content, a manifest file of the video content, and initial video data fragments of the video content. The content display application on the mobile device can also determine a priority order of the video content for each of the video selection options displayed in the viewport on the integrated display of the mobile device. The mobile device can then communicate the priority order of the video content to the television display device, which initiates the request to the video content server for the initial video data based on the priority order of the respective video content. Further, the television display device can receive and process the initial video data corresponding to each of the video content in preparation for displaying any one of the video content when a channel change request is received from the mobile device.

The mobile device may receive a user selection, such as a user touch input, of a video selection option displayed in the viewport on the integrated display of the mobile device. The mobile device can then communicate the user selection as a channel change request to the television display device. The channel change request initiates the television display device to begin rendering the initial video data fragments of the corresponding video content, where the manifest file and the initial video data fragments are already available for processing at the television display device. The television display device can then prioritize to continue receiving the video content from the video content server for uninterrupted display of the video content for viewing on the television display device.

In an event that the television display device does not already have the initial video data available from the video content server when the mobile device communicates the channel change request for the selected video content, the television display device can initiate a request to fetch a thumbnail image, or other graphic or static image, that represents the selected video content. Alternatively or in addition, the television display device can also request to initially receive the audio for the selected video content. The television display device can then display the image and/or playback the audio corresponding to the selected video content during the delay while waiting to receive the video data fragments and beginning to display the video content for viewing.

The mobile device may receive an additional navigation input in the viewport displayed on the integrated display of the mobile device, and then display different video selection options for other video content in the viewport responsive to the additional navigation input. The content display application on the mobile device again determines the video identifiers of the other video content for each of the different video selection options displayed in the viewport. The mobile device can then communicate the video identifiers, as well as the priority order, to the television display device that initiates another request to the video content server for the initial video data corresponding to each of the other video content based on the video identifiers received from the mobile device.

While features and concepts of fast television channel change initiated from a second screen device can be implemented in any number of different devices, systems, networks, environments, and/or configurations, aspects of fast television channel change initiated from a second screen device are described in the context of the following example devices, systems, and methods.

FIG. 1 illustrates an example video content viewing system 100 in which aspects of fast television channel change initiated from a second screen device can be implemented. The example system 100 includes a mobile device 102, shown as a mobile phone, and generally referred to herein as the second screen device of the system. The example system also includes a television display device 104, shown as being remote from the mobile device 102, and generally referred to herein as the first screen device in the system. Although generally referred to as a television, the television display device 104 represents any type of display panel, display device, computer display, smart television, and the like that can receive, process, and display streaming video content, such as live television content, recorded video content, on-demand content, and any other type of streaming content. Further, the mobile device 102 is representative of any type of computing device that may be utilized as a second screen device in the video content viewing system 100, as described with reference to the computing device shown in FIG. 3.

In this example, the mobile device 102 and the television display device 104 are configured as part of an in-home network 106 (e.g., a Wi-Fi network) with a router device 108 implemented as an access point that provides for wireless communication between the devices, as well as network connectivity via a network 110. The example system 100 includes a video content server 112 from which video content 114 can be distributed to the mobile device 102 and/or to the television display device 104 via the network 110 and the router device 108 in the in-home network 106. The video content server 112 is also generally referred to as a back-end server and in implementations, may be a server device of a cloud-based service from which the video content 114 can be requested and distributed to devices that render and display video content for viewing.

Any of the devices, servers, and/or services described herein can communicate via the network 110, such as for data communication between the mobile device 102 and the video content server 112, and between the television display device 104 and the video content server 112. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The mobile device 102 has an integrated display 116, which can be used to display video content in a content display region 118 of the integrated display. The video content that is displayable in the content display region 118 can include live television content, recorded video content, on-demand content, images, graphics, and any other type of data or information related to video content that is received by the mobile device 102 and/or displayed on the integrated display 116 of the mobile device. The integrated display 116 also has a viewport 120, or viewport region of the display, which can also be used to display any type of video content, as well as information or data related to the video content. In this example, video selection options 122 for several different video content are displayed in the viewport 120 on the integrated display 116 of the mobile device.

Generally, the video selection options 122 are each selectable by a user of the mobile device 102, such as to select video content to watch on the mobile device or on the television display device 104. For example, the user of the mobile device 102 may select one of the video selection options 122 and the corresponding video content 114 can be requested from the video content server 112. The video content 114 can be requested by the mobile device 102 and then displayed for viewing on the integrated display 116 in the content display region 118. Alternatively, the video content 114 can be requested from the video content server 112 and then displayed for viewing on the television display device 104.

A user of the mobile device 102 can initiate a navigation input in a viewport 120 that is displayed on the integrated display 116 of the mobile device. The mobile device 102 receives the navigation input as a user manipulation to move the video selection options 122 into view in the viewport 120, and to move previous video selection options out of view through the viewport. For example, the video selection options 122 may be organized in a scrollable list and the user manipulation in the viewport 120 moves the scrollable list up or down, displaying other video selection options 122 in the viewport.

Alternatively, the video selection options 122 may be organized as panels in an arrangement that allows user manipulation in the viewport 120 as a navigation input up, down, left, right, diagonal, or any other direction to display other video selection options 122 in the viewport. Generally, a navigation input may be initiated as an up or down scrolling, an up or down, or left or right lateral swiping motion, as a gesture or flicker (e.g., up, down, left, right, diagonal), or as any other type of navigation input. Although only five video selection options 122 are shown in the viewport 120 on the integrated display 116 of the mobile device 102 in this example, more than the five or fewer than the five video selection options can be displayed at any one time in the viewport. Further, the scrollable list or viewport panels of video selection options can include any number of additional video selection options of video content that the user can select for viewing.

Figure 3:
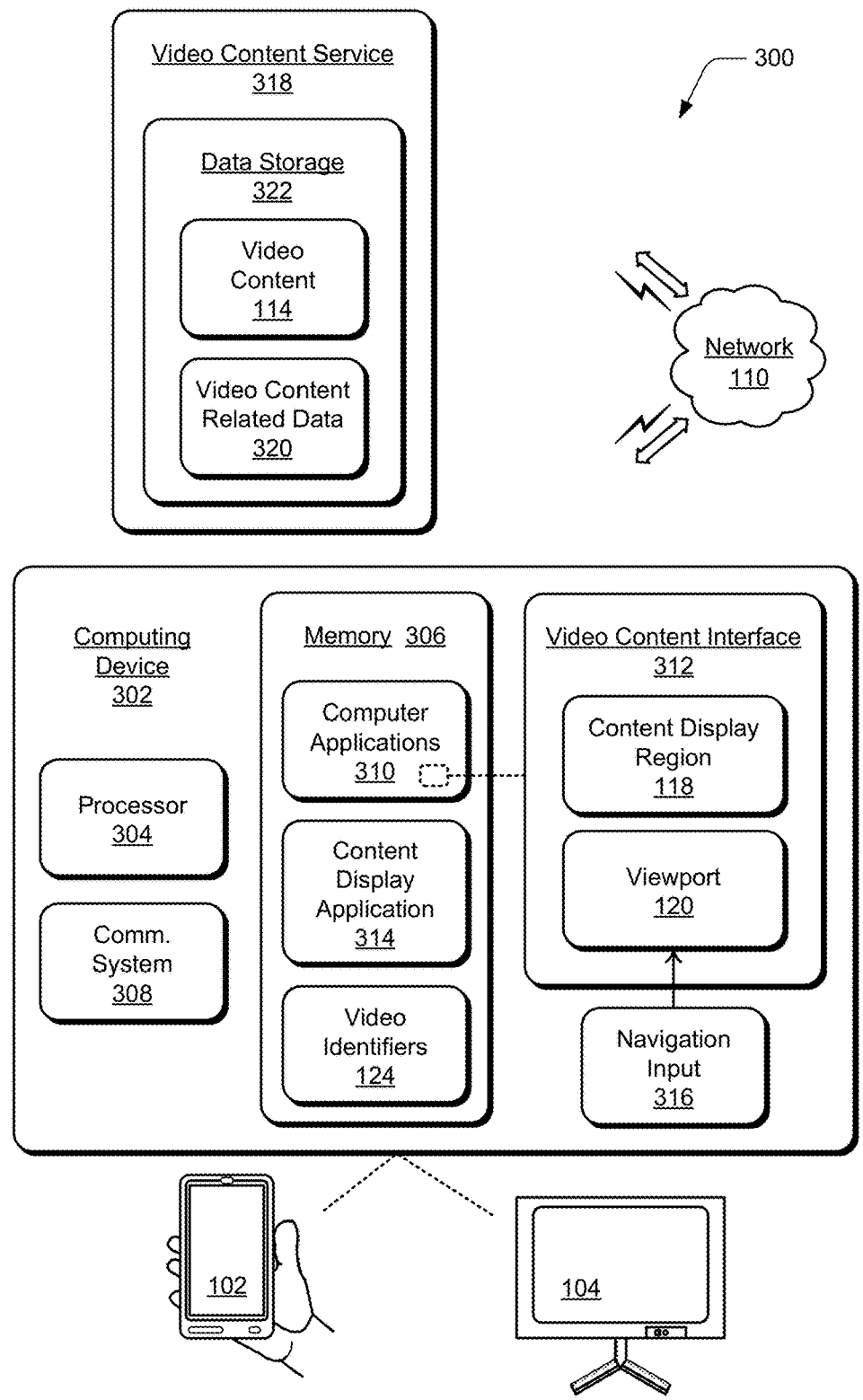
FIG. 3 illustrates an example system of devices in which aspects of fast television channel change initiated from a second screen device can be implemented as described herein.

As further detailed in the system description of the example system shown in FIG. 3, the mobile device 102 implements a content display application (e.g., as a module, a component, a software application, etc.) that implements techniques of fast television channel change initiated from a second screen device as described herein. Similarly, the television display device 104 can implement an instance of the content display application, such as in a smart television or other display device that is generally configured as a computing device.

In the described techniques, the content display application on the mobile device 102 can determine video identifiers 124 of the video content for each of the video selection options 122 that are displayed in the viewport 120 on the integrated display 116 of the mobile device. Each of the video identifiers 124 uniquely identifies a respective video content 114, which can be requested from the video content server 112 based on the unique video identifier. The content display application can also be implemented to determine a priority order of the video content 114 for each of the video selection options 122 that are displayed in the viewport 120 on the integrated display 116 of the mobile device 102.

The video selection options 122 represent likely user selections of video content for viewing and are the small set of video content that is available at any given time (e.g., when displayed in the viewport 120 on the integrated display 116 of the mobile device 102). The video selection options 122 may be initially displayed in the viewport 120 as search query results, based on a user browsing to find content, or as recommendations of video content for viewing. For example, the user of the mobile device 102 may type in a search query and the set of search results are the ten or so video selection options 122, some of which are displayed in the viewport 120. The video selection options for the video content that has a higher likelihood of being selected by the user can be displayed first in the viewport, such as "video selection option #1", then "video selection option #2", and so on. The user of the mobile device may then also scroll down the list of video selection options 122 to see other video content options. As the video selection options that are displayed changes, the content display application can dynamically calculate which of the video content has the highest chance of being selected for viewing by the user, and this changes in real-time.

In another example, the user of the mobile device 102 may browse to find content entering a structured view, such as browsing for content by category or genre, or by actor, movie rating, or by any other identifiable factor. Alternatively, the video selection options 122 may be displayed in the viewport 120 as recommendations of video content that the user of the mobile device may like to watch, and the user can simply select one of the recommendations.

The mobile device 102 (as the second screen device) can then communicate (at 126) the video identifiers 124 to the television display device 104 (as the first screen device), along with an indication as to the priority order of the video content. As noted above, the mobile device 102 and the television display device 104 are configured for wireless communication via the router device 108 within the network 106, and the mobile device 102 communicates the video identifiers 124 and the priority order of the video content to the television display device 104 via the router device.

The television display device 104 receives the video identifiers 124 from the mobile device 102 and can then initiate a request to the video content server 112 for initial video data 128 corresponding to each of the video content 114 based on the video identifiers 124 and based on the priority order of the video content received from the mobile device. The initial video data 128 that corresponds to each of the video content 114 includes the video identifier 124 of a video content 114, a manifest file 130 of the video content, and initial video data fragments 132 of the video content. The television display device 104 can receive the initial video data 128 from the video content server 112, and process the initial video data 128 corresponding to each of the video content 114 in preparation for displaying any one of the video content when a channel change request is received from the mobile device. As described above, the displayed list of video selection options 122 may change in the viewport 120 at the mobile device 102, and the television display device 104 can discard the initial video data that corresponds to video selection options no longer considered as likely candidates for user selection.

The mobile device 102 may receive a user selection for video content 114, such as a user touch input of a video selection option 122 that is displayed in the viewport 120 on the integrated display 116 of the mobile device. The mobile device 102 can then communicate (at 134) the user selection as a channel change request 136 to the television display device 104. The television display device 104 can receive the channel change request 136 and begin rendering the initial video data fragments 132 of the corresponding video content 114, which are already available for processing at the television display device. The television display device 104 can then prioritize to continue receiving the video content 114 from the video content server 112 for uninterrupted display of the video content 114 for viewing on the television display device.

In an event that the television display device 104 does not already have the initial video data 128 available from the video content server 112 when the mobile device 102 communicates the channel change request 136 for the selected video content, the television display device 104 can initiate a request to fetch video content related data, such as a thumbnail image, or other graphic or static image, that represents the selected video content. Alternatively or in addition, the television display device 104 can also request to initially receive the audio for the selected video content. The television display device 104 can then display the image and/or playback the audio corresponding to the selected video content during the delay while waiting to receive the video data fragments 132 and beginning to display the video content for viewing.

The mobile device 102 may receive an additional navigation input in the viewport 120 displayed on the integrated display 116 of the mobile device, and then display different video selection options for other video content in the viewport responsive to the additional navigation input. The content display application on the mobile device 102 again determines the video identifiers 124 of the other video content for each of the different video selection options displayed in the viewport. The mobile device 102 can then communicate the video identifiers 124 to the television display device 104 that initiates another request to the video content server 112 for the initial video data 128 that corresponds to each of the other video content based on the video identifiers 124 received from the mobile device.

Figure 2:
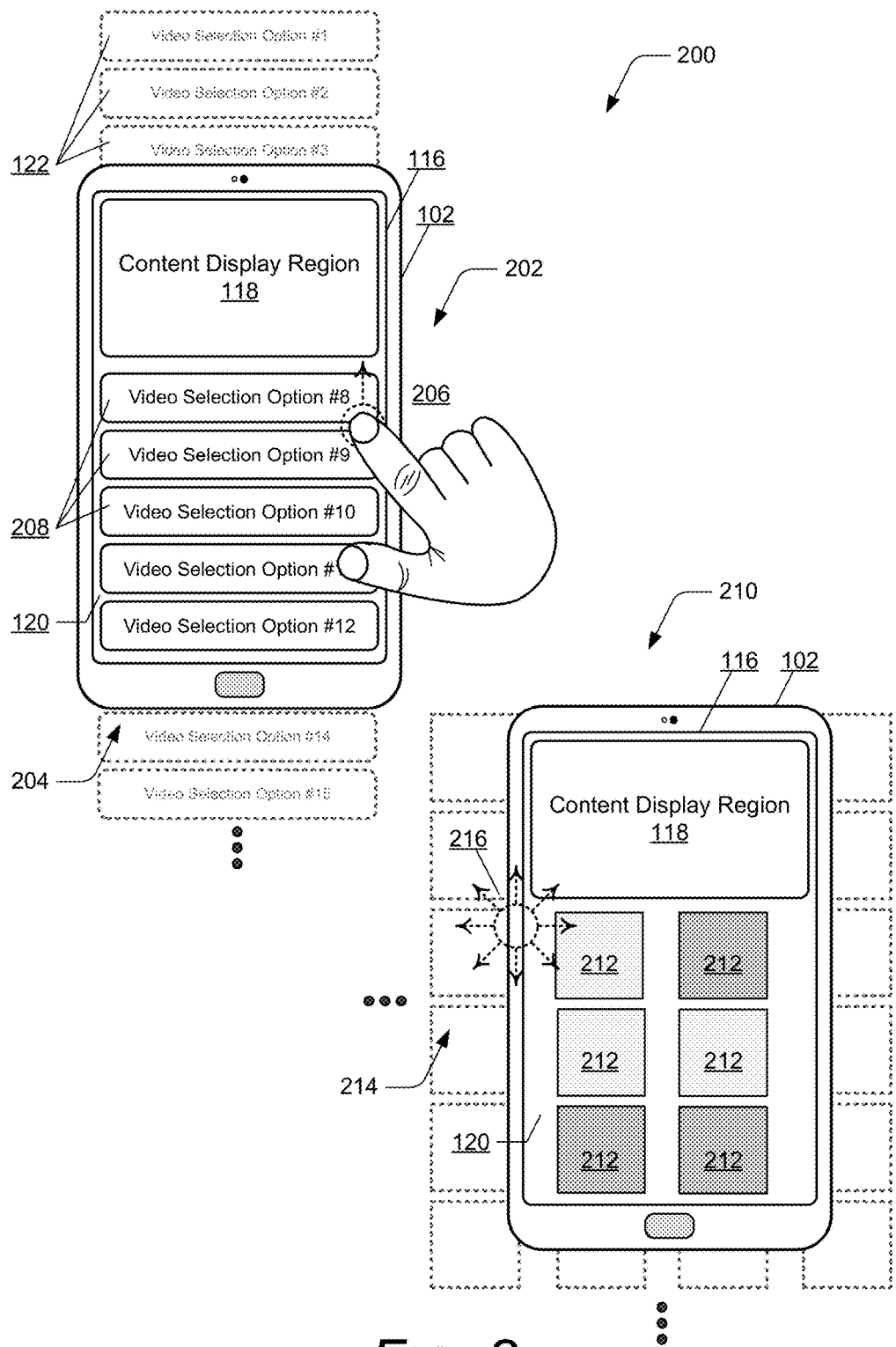
FIG. 2 further illustrates example devices that can be implemented in the video content viewing system for fast television channel change initiated from a second screen device as described herein.

FIG. 2 further illustrates examples 200 of devices that can be implemented in the video content viewing system 100 for fast television channel change initiated from a second screen device as shown and described with reference to FIG. 1. In a first example 202, the video selection options displayed in the viewport 120 on the integrated display 116 of the mobile device 102 are shown organized in a scrollable list 204 that includes any number of additional video selection options of video content that the user can navigate and select for viewing. For example, a navigation input 206 in the viewport 120 is received by the mobile device 102 as a user manipulation to scroll up the video selection options 122 out of view through the viewport, and move additional video selection options 208 into view in the viewport 120. A user manipulation in the viewport 120 can be received by the mobile device to scroll up or scroll down the video selection options that are displayed in the viewport 120 on the integrated display 116 of the mobile device.

In a second example 210, video selection options 212 are shown organized as panels 214 in an arrangement that allows for user manipulation in the viewport 120 as a navigation input 216 up, down, left, right, diagonal, or any other direction to display other video selection options in the viewport. Generally, a navigation input may be initiated as an up or down scrolling, an up or down, or left or right lateral swiping motion, as a gesture or flicker (e.g., up, down, left, right, diagonal), or as any other type of navigation input.

FIG. 3 illustrates an example system 300 of devices in which aspects of fast television channel change initiated from a second screen device can be implemented. The example system 300 includes a computing device 302, such as the mobile phone 102 and the television display device 104 as shown and described with reference to FIGS. 1 and 2. The computing device 302 may be implemented as any type of a mobile phone, tablet device, media playback, computing, communication, gaming, entertainment, portable electronic media device, or computer device. The computing device 302 can be implemented with various components, such as a processor 304 (or processing system) and memory 306, and with any number and combination of different components as further described with reference to the example device shown in FIG. 6.

Although not shown, the computing device 302 can include a power source, such as a battery, to power the various device components. Further, the computing device 302 can include different wireless radio systems, such as for Wi-Fi, Bluetooth™, Mobile Broadband, LTE, or any other wireless communication system or format. Generally, the computing device 302 implements a communication system 308 that includes a radio device, antenna, and chipset that is implemented for wireless communication with other devices, networks, and services.

The computing device 302 includes one or more computer applications 310 that generate a video content interface 312, which includes the content display region 118 and the viewport 120 in which the video selection options 122 for video content 114 are displayed, such as in the integrated display 116 of the mobile device 102. The computer applications 310 include the content display application 314 that implements the techniques of fast television channel change initiated from a second screen device as described herein.

The content display application 314 can be implemented as a software application or module, such as computer-executable software instructions that are executable with the processor 304 (or with a processing system) to implement the described techniques. The content display application 314 can be stored on computer-readable storage memory (e.g., the device memory 306), such as any suitable memory device or electronic data storage implemented in the computing device. Although shown as a separate module or component in memory 306, the content display application 314 may be integrated as a module or component with any of the computer applications 310.

As noted above with reference to the mobile device 102, a user of the computing device 302 can initiate a navigation input 316 in the viewport 120 that is displayed on the integrated display of the device in the video content interface 312. The computing device 302 receives the navigation input 316 as a user manipulation to move video selection options into view in the viewport 120, and to move previous video selection options out of view through the viewport. Generally, the navigation input 316 can be received as an up or down scrolling, an up or down, or left or right lateral swiping motion, as a gesture or flicker (e.g., up, down, left, right, diagonal), or as any other type of navigation input.

In the described techniques, the content display application 314 on the computing device 302 can determine the video identifiers 124 of the video content 114 for each of the video selection options that are displayed in the viewport 120 on the integrated display 116 of the device. Each of the video identifiers 124 uniquely identifies a respective video content 114, which can be requested from a video content service 318 based on the unique video identifier. The content display application 314 is also implemented to determine a priority order of the video content 114 for each of the video selection options that are displayed in the viewport 120 on the integrated display 116 of the device.

The example system 300 includes the video content service 318 (e.g., a cloud-based content service) that is accessible by the computing device 302 to request the video content 114 and other video content related data 320. The video content service 318 includes data storage 322 that may be implemented as any suitable memory, memory device, or electronic data storage for network-based data storage. The data storage 322 can maintain the video content 114 and the other video content related data 320, which may include a thumbnail image, or other graphic or static image, that represents the respective video content 114, and may also include the audio that corresponds to the video content. The video content service 318 can also be implemented with server devices (e.g., video content server 112) that are representative of one or multiple hardware server devices of the video content service. Further, the video content service 318 can be implemented with various components, such as a processing system and memory, as well as with any number and combination of different components as further described with reference to the example device shown in FIG. 6.

Example methods 400 and 500 are described with reference to respective FIGS. 4 and 5 in accordance with one or more aspects of fast television channel change initiated from a second screen device. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
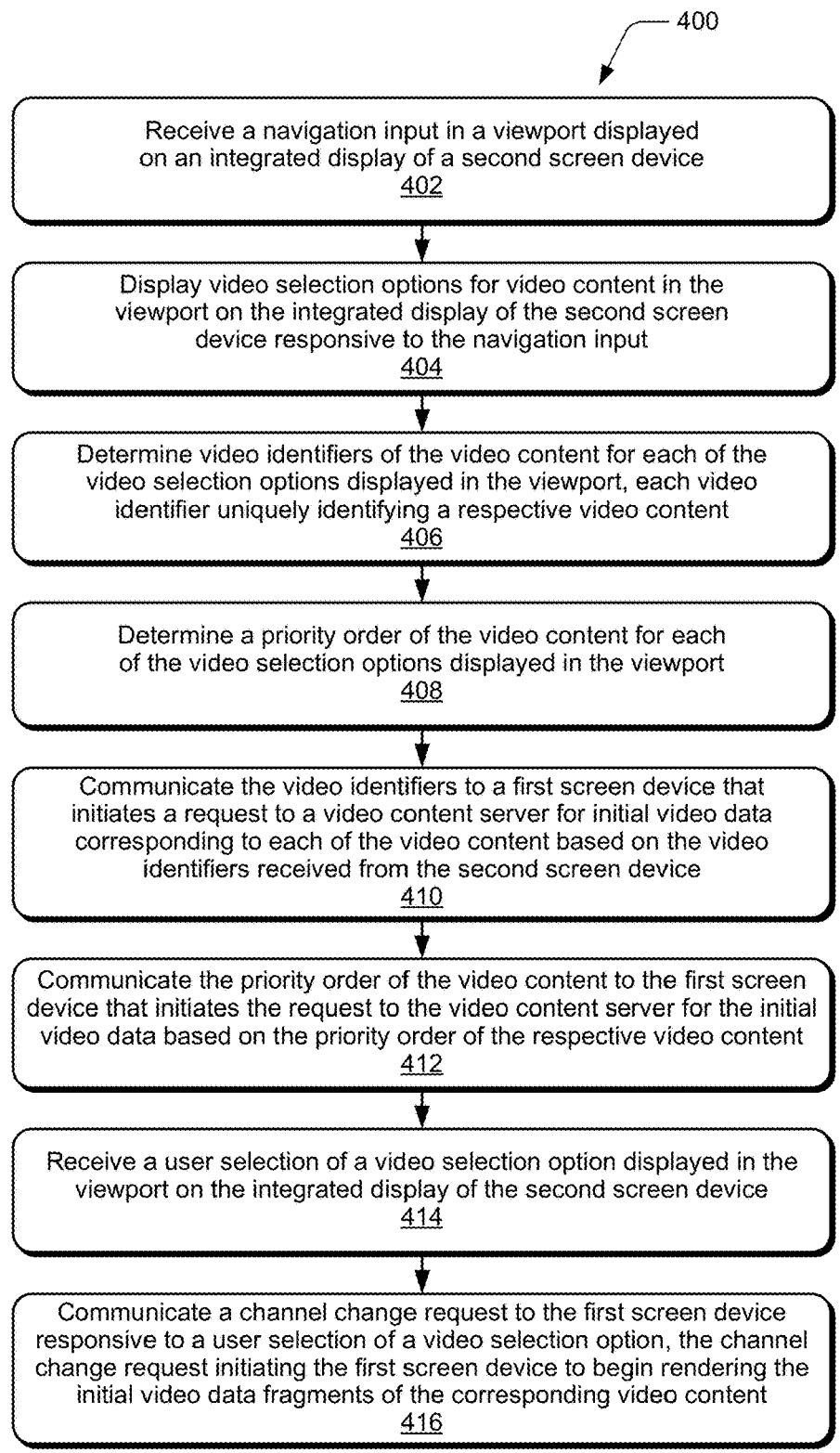
FIG. 4 illustrates example method(s) of fast television channel change initiated from a second screen device in accordance with techniques described herein.

FIG. 4 illustrates example method(s) 400 of fast television channel change initiated from a second screen device, and is generally described with reference to the mobile phone or mobile device as a second screen device in a video content viewing system. The order in which the method is described is not intended to be construed as a limitation, and any number or combination of the method operations can be combined in any order to implement a method, or an alternate method.

At 402, a navigation input is received in a viewport displayed on an integrated display of a second screen device. For example, the mobile device 102 is the second screen device in the video content viewing system 100, and the mobile device 102 receives a navigation input 316 as a user manipulation to move the video selection options 122 into view in the viewport 120, and to move previous video selection options out of view through the viewport.

At 404, video selection options for video content are displayed in the viewport on the integrated display of the second screen device responsive to the navigation input. For example, the viewport 120 that is displayed on the integrated display 116 of the mobile device 102 includes the video selection options 122 for several different video content. The video selection options 122 that are displayed in the viewport 120 are a subset of a group of video selection options that are displayable when moved into view in the viewport.

At 406, video identifiers of the video content are determined for each of the video selection options displayed in the viewport, each video identifier uniquely identifying a respective video content. For example, the content display application 314 on the mobile device 102 determines the video identifiers 124 of the video content 114 for each of the video selection options 122 that are displayed in the viewport 120 on the integrated display 116 of the mobile device. Each of the video identifiers 124 uniquely identifies a respective video content 114, which can be requested from the video content server 112 based on the unique video identifier.

At 408, a priority order of the video content is determined for each of the video selection options displayed in the viewport. For example, the content display application 314 on the mobile device 102 determines a priority order of the video content 114 for each of the video selection options 122 that are displayed in the viewport 120 on the integrated display 116 of the mobile device 102.

At 410, the video identifiers are communicated to a first screen device that initiates a request to a video content server for initial video data corresponding to each of the video content based on the video identifiers received from the second screen device. For example, the television display device 104 is the first screen device in the video content viewing system 100, and the mobile device (as the second screen device) communicates the video identifiers 124 to the television display device 104 (as the first screen device). The television display device 104 receives the video identifiers 124 from the mobile device 102 and requests the initial video data 128 corresponding to each of the video content 114 from the video content server 112. The initial video data 128 that corresponds to a respective video content includes the video identifier 124 of the video content, a manifest file 130 of the video content, and initial video data fragments 132 of the video content.

At 412, the priority order of the video content is communicated to the first screen device that initiates the request to the video content server for the initial video data based on the priority order of the respective video content. For example, the mobile device 102 communicates the priority order of the video content 114 to the television display device 104, which then initiates a request to the video content server 112 for the initial video data 128 corresponding to each of the video content 114 based on the video identifiers 124 and based on the priority order of the video content received from the mobile device.

At 414, a user selection is received of a video selection option displayed in the viewport on the integrated display of the second screen device. For example, the mobile device 102 receives a user selection for video content 114, such as a user touch input of a video selection option 122 that is displayed in the viewport 120 on the integrated display 116 of the mobile device.

At 416, a channel change request is communicated to the first screen device responsive to a user selection of a video selection option, the channel change request initiating the first screen device to begin rendering the initial video data fragments of the corresponding video content. For example, the mobile device 102 communicates the user selection as the channel change request 136 to the television display device 104, which begins rendering the initial video data fragments 132 of the corresponding video content 114, which are already available for processing at the television display device.

Aspects of the method 400 can be repeated as additional user navigation inputs are received. For example, the mobile device 102 may receive an additional navigation input in the viewport 120 displayed on the integrated display 116 of the mobile device (at 402), and then display different video selection options for other video content in the viewport responsive to the additional navigation input (at 404). The content display application 314 on the mobile device 102 again determines the video identifiers 124 of the other video content for each of the different video selection options displayed in the viewport (at 406). The mobile device 102 can then communicate the video identifiers 124 to the television display device 104 that initiates another request to the video content server 112 for the initial video data 128 that corresponds to each of the other video content based on the video identifiers 124 received from the mobile device (at 410).

Figure 5:
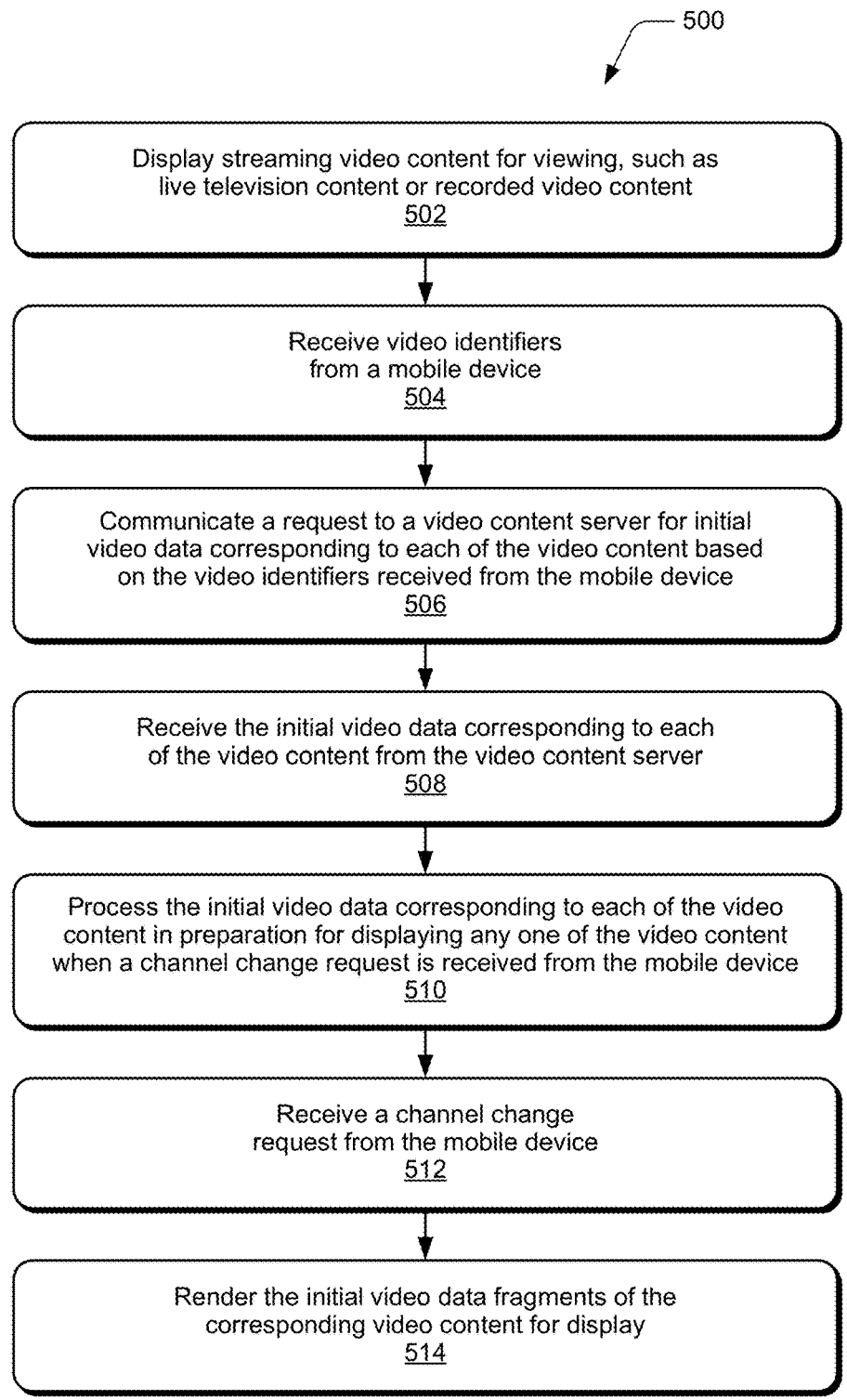
FIG. 5 illustrates example method(s) of fast television channel change initiated from a second screen device in accordance with techniques described herein.

FIG. 5 illustrates example method(s) 500 of fast television channel change initiated from a second screen device, and is generally described with reference to the television display device or remote display device as a first screen device in a video content viewing system. The order in which the method is described is not intended to be construed as a limitation, and any number or combination of the method operations can be combined in any order to implement a method, or an alternate method.

At 502, streaming video content is displayed for viewing, such as live television content or recorded video content. For example, the television display device 104 is the first screen device in the video content viewing system 100 and displays streaming video content for viewing, such as live television content, recorded video content, on-demand video content, and the like.

At 504, video identifiers are received from a mobile device. For example, the mobile device 102 is the second screen device in the video content viewing system 100 and the television display device 104 receives the video identifiers 124 from the mobile device. The video identifiers 124 correlate to the video selection options 122 for video content 114 displayed in the viewport 120 on the integrated display 116 of the mobile device 102. The video identifiers 124 of the video content 114 are determined by the content display application 314 for each of the video selection options 122 displayed in the viewport 120, and each video identifier 124 uniquely identifies a respective video content.

At 506, a request is communicated to a video content server for initial video data corresponding to each of the video content based on the video identifiers received from the mobile device. For example, the television display device 104 communicates a request to the video content server 112 for the initial video data 128 that corresponds to each of the video content 114 based on the video identifiers 124, and optionally, based on the priority order of the respective video content.

At 508, the initial video data corresponding to each of the video content is received from the video content server. For example, the television display device 104 receives the initial video data 128 that corresponds to each of the video content 114 from the video content server 112. The initial video data 128 corresponding to a video content 114 includes the video identifier 124 of the video content, the manifest file 130 of the video content, and initial video data fragments 132 of the video content.

At 510, the initial video data corresponding to each of the video content is processed in preparation for displaying any one of the video content when a channel change request is received from the mobile device. For example, the television display device 104 processes (or pre-processes) the initial video data 128 corresponding to each of the video content 114 in preparation for displaying any one of the video content when a channel change request is received from the mobile device.

At 512, a channel change request is received from the mobile device. For example, the television display device 104 receives the channel change request 136 from the mobile device 102 when the mobile device communicates the channel change request to the television display device responsive to a user selection of a video selection option 122 displayed in the viewport 120 on the integrated display 116 of the mobile device.

At 514, the initial video data fragments of the corresponding video content are rendered for display. For example, the television display device 104 begins rendering the initial video data fragments 132 of the corresponding video content 114, which are already available for processing at the television display device. The television display device 104 also prioritizes to continue receiving the video content 114 from the video content server 112 for uninterrupted display of the video content 114 for viewing on the television display device.

Figure 6:
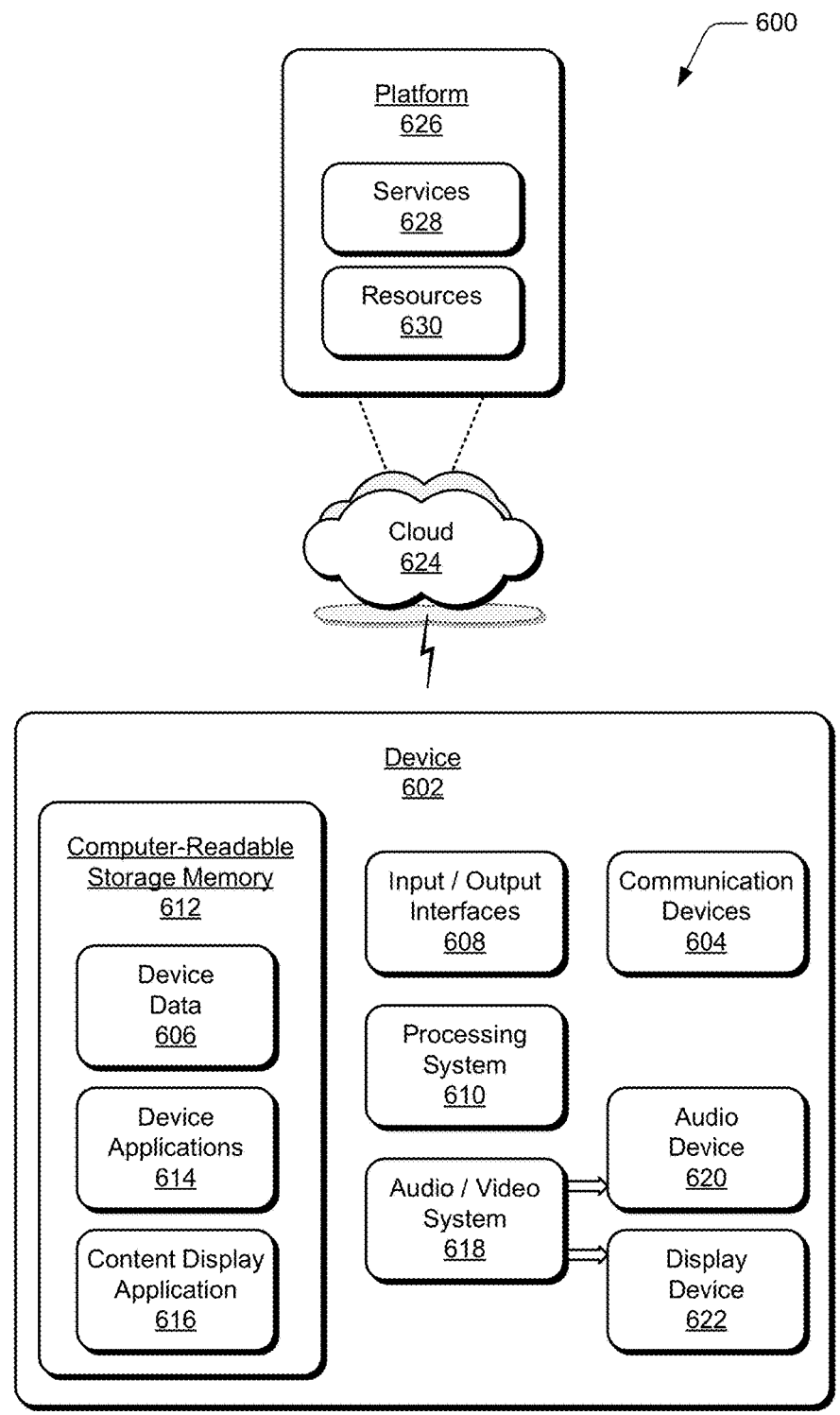
FIG. 6 illustrates an example system with an example device that can implement fast television channel change initiated from a second screen device as described herein.

FIG. 6 illustrates an example system 600 that includes an example device 602, which can implement aspects of fast television channel change initiated from a second screen device. The example device 602 can be implemented as any of the computing devices and/or services (e.g., server devices) described with reference to the previous FIGS. 1-5, such as any type of computing device, client device, mobile phone, tablet, communication, entertainment, gaming, media playback, and/or other type of device. For example, the mobile device 102, the television display device 104, the computing device 302, and/or server devices of the video content service 318 (e.g., a cloud-based service) may be implemented as the example device 602.

The device 602 includes communication devices 604 that enable wired and/or wireless communication of device data 606, such as the video identifiers, priority ordering of the video content, and other data and content that is transferred from one computing device to another, and/or synched between multiple computing devices. The device data can include any type of audio, video, image, and/or graphic data that is generated by applications executing on the device. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device that may be integrated with device 602. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage memory 612, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 612 provides storage of the device data 606 and various device applications 614, such as an operating system that is maintained as a software application with the computer-readable storage memory and executed by the processing system 610. In this example, the device applications also include various computer applications and a content display application 616 that implements embodiments of fast television channel change initiated from a second screen device, such as when the example device 602 is implemented as the mobile device 102, the television display device 104, and/or the computing device 302. An example of the content display application 616 is the content display application 314 that is implemented by the computing device 302, as shown and described with reference FIG. 3.

The device 602 also includes an audio and/or video system 618 that generates audio data for an audio device 620 and/or generates display data for a display device 622. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device. In embodiments, at least part of the techniques described for fast television channel change initiated from a second screen device may be implemented in a distributed system, such as over a "cloud" 624 in a platform 626. The cloud 624 includes and/or is representative of the platform 626 for services 628 and/or resources 630. For example, the services 628 may include the video content service described with reference to FIG. 3.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although aspects of fast television channel change initiated from a second screen device have been described in language specific to features and/or methods, the appended claims are not necessarily limited to the specific features or methods described. Rather, the specific features and methods are disclosed as example implementations of fast television channel change initiated from a second screen device, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method for fast television channel change initiated from a second screen device, the method comprising:
   receiving a navigation input that browses for content on the second screen device, the navigation input received in a viewport displayed on an integrated display of the second screen device;
   displaying, in the viewport on the integrated display of the second screen device, a plurality of video selection options for video content in response to the navigation input;
   determining video identifiers of the video content for each of the plurality of video selection options displayed in the viewport, each of the video identifiers uniquely identifying a respective video content associated with one of the plurality of video selection options; and
   communicating the video identifiers to a first screen device that initiates, prior to selection of any of the plurality of video selection options by a user of the second screen device, a request to a video content server for initial video data corresponding to each of the video content, the request being based on the video identifiers received from the second screen device.

2. The method as recited in claim 1, wherein the second screen device is a mobile device and the first screen device is a television display device configured to receive the video identifiers from the mobile device and request the initial video data corresponding to each of the video content from the video content server.

3. The method as recited in claim 1, wherein the video selection options displayed in the viewport are a subset of a group of video selection options that are displayable when moved into view in the viewport.

4. The method as recited in claim 1, wherein the initial video data corresponding to a video content comprises the video identifier of the video content, a manifest file of the video content, and initial video data fragments of the video content.

5. The method as recited in claim 4, further comprising:
   communicating a channel change request to the first screen device responsive to a user selection of a video selection option displayed in the viewport on the integrated display of the second screen device, the channel change request initiating the first screen device to begin rendering the initial video data fragments of the corresponding video content.

6. The method as recited in claim 1, further comprising:
   determining a priority order of the video content for each of the video selection options displayed in the viewport; and communicating the priority order of the video content to the first screen device that initiates the request to the video content server for the initial video data based on the priority order of the respective video content.

7. The method as recited in claim 1, wherein receiving the navigation input as a user manipulation to move the video selection options into view in the viewport and to move previous video selection options out of view through the viewport.

8. The method as recited in claim 1, wherein the video content comprises at least one of live streaming television content and recorded video content.

9. The method as recited in claim 1, further comprising:
receiving an additional navigation input in the viewport displayed on the integrated display of the second screen device;
displaying a different plurality of video selection options for other video content in the viewport responsive to the additional navigation input;
determining the video identifiers of the other video content for each of the different plurality of video selection options displayed in the viewport; and
communicating the video identifiers to the first screen device that initiates, prior to selection of any of the different plurality of video selection options by a user of the second screen device, another request to the video content server for the initial video data corresponding to the other video content, the request being based on the video identifiers received from the second screen device.

10. A mobile device implemented as a second screen device for fast television channel change initiated from the second screen device, the mobile device comprising:
an integrated display configured to display a viewport in which a plurality of video selection options for video content are displayed responsive to a navigation input that browses the plurality of video selection options in the viewport; and
a memory and processor system configured to execute a content display application as a computer application that is implemented to:
determine video identifiers of the video content for each of the plurality of video selection options displayed in the viewport, each video identifier uniquely identifying a respective video content; and
initiate communication of the video identifiers to a remote display device that initiates, prior to selection of any of the plurality of video selection options at the second screen device, a request to a video content server for initial video data corresponding to each of the video content, the request being based on the video identifiers received from the mobile device.

11. The mobile device as recited in claim 10, wherein the video selection options displayed in the viewport are a subset of a group of video selection options that are displayable when moved into view in the viewport.

12. The mobile device as recited in claim 10, wherein the initial video data corresponding to a video content comprises the video identifier of the video content, a manifest file of the video content, and initial video data fragments of the video content.

13. The mobile device as recited in claim 12, wherein the content display application is further implemented to initiate communication of a channel change request to the remote display device responsive to a user selection of a video selection option displayed in the viewport on the integrated display of the mobile device, the channel change request initiating the remote display device to begin rendering the initial video data fragments of the corresponding video content.

14. The mobile device as recited in claim 10, wherein the content display application is further implemented to:
determine a priority order of the video content for each of the video selection options displayed in the viewport; and
initiate communication of the priority order of the video content to the remote display device that initiates the request to the video content server for the initial video data based on the priority order of the respective video content.

15. The mobile device as recited in claim 10, wherein the content display application is further implemented to receive the navigation input in the viewport as a user manipulation to move the video selection options into view in the viewport and to move previous video selection options out of view through the viewport.

16. The mobile device as recited in claim 10, wherein:
the integrated display is configured to display a different plurality of video selection options for other video content in the viewport responsive to an additional navigation input in the viewport; and
the content display application is further implemented to:
determine the video identifiers of the other video content for each of the different plurality of video selection options displayed in the viewport; and
initiate communication of the video identifiers to the remote display device that initiates, prior to selection of any of the different plurality of video selection options by a user of the second screen device, another request to the video content server for the initial video data corresponding to each of the other video content, the request being based on the video identifiers received from the mobile device.

17. A system for fast television channel change initiated from a second screen device, the system comprising:
a mobile device implemented as the second screen device, the mobile device configured to:
display a plurality of video selection options for video content in a viewport displayed on an integrated display of the mobile device responsive to a navigation input that browses a listing or panels of the plurality of video selection options in the viewport; and
determine video identifiers of the video content for each of the plurality of video selection options displayed in the viewport, each video identifier uniquely identifying a respective video content; and
a television display device implemented as a first screen device, the television display device configured to:
receive the video identifiers from the mobile device; and
communicate a request to a video content server, prior to selection of any of the plurality of video selection options at the second screen device, for initial video data corresponding to each of the video content, the request being based on the video identifiers received from the mobile device.

18. The system as recited in claim 17, wherein the television display device is configured to:
receive the initial video data corresponding to each of the video content from the video content server; and
process the initial video data corresponding to each of the video content in preparation for displaying any one of the video content when a channel change request is received from the mobile device.

19. The system as recited in claim 17, wherein the initial video data corresponding to a video content comprises the video identifier of the video content, a manifest file of the video content, and initial video data fragments of the video content.

20. The system as recited in claim 19, wherein:

the mobile device is configured to communicate a channel change request to the television display device responsive to a user selection of a video selection option displayed in the viewport on the integrated display of the mobile device; and the television display device is configured to:

receive the channel change request from the mobile device; and render the initial video data fragments of the corresponding video content for display.

* * * * *